United States Patent
Pillar et al.

(10) Patent No.: US 7,725,225 B2
(45) Date of Patent: May 25, 2010

(54) REFUSE VEHICLE CONTROL SYSTEM AND METHOD WITH FOOTBOARD

(75) Inventors: Duane R. Pillar, Oshkosh, WI (US); William M. Woolman, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 218 days.

(21) Appl. No.: 11/929,071

(22) Filed: Oct. 30, 2007

(65) Prior Publication Data

US 2008/0109131 A1 May 8, 2008

Related U.S. Application Data

(63) Continuation of application No. 10/668,002, filed on Sep. 22, 2003, now Pat. No. 7,412,307, which is a continuation-in-part of application No. 10/314,918, filed on Dec. 9, 2002, now Pat. No. 7,072,745.

(51) Int. Cl.
*G06F 7/00* (2006.01)
*B60K 28/00* (2006.01)

(52) U.S. Cl. .......................... 701/36; 180/272; 180/273

(58) Field of Classification Search ................... 701/36; 180/271, 272, 273
See application file for complete search history.

(56) References Cited

U.S. PATENT DOCUMENTS

| | | |
|---|---|---|
| 3,720,863 A | 3/1973 | Ringla et al. |
| 3,729,106 A | 4/1973 | Barbieri |
| 4,041,470 A | 8/1977 | Slane et al. |
| 4,162,714 A | 7/1979 | Correll |
| 4,180,803 A | 12/1979 | Haubner et al. |
| 4,355,385 A | 10/1982 | Hampshire et al. |
| 4,453,880 A | 6/1984 | Leisse |
| 4,516,121 A | 5/1985 | Moriyama et al. |
| 4,542,802 A | 9/1985 | Garvey et al. |
| RE32,140 E | 5/1986 | Tokuda et al. |
| 4,639,609 A | 1/1987 | Floyd et al. |
| 4,646,232 A | 2/1987 | Chang et al. |
| 4,744,218 A | 5/1988 | Edwards et al. |
| 4,760,275 A | 7/1988 | Sato et al. |
| 4,809,177 A | 2/1989 | Windle et al. |
| 4,809,803 A | 3/1989 | Ahern et al. |
| 4,842,326 A | 6/1989 | DiVito |
| 4,843,557 A | 6/1989 | Ina et al. |

(Continued)

FOREIGN PATENT DOCUMENTS

DE 40 41 483 A1 6/1992

(Continued)

OTHER PUBLICATIONS

"Dana Spicer Central Tire Inflation System Specifications," Dana Corporation, Kalamazoo, Michigan, May 2000 (2 pgs.).

(Continued)

*Primary Examiner*—Khoi Tran
*Assistant Examiner*—Brian J Broadhead
(74) *Attorney, Agent, or Firm*—Foley & Lardner LLP

(57) ABSTRACT

A refuse vehicle is disclosed that includes a control system which comprises a plurality of microprocessor based interface modules, a communication network, and at least one output device. The control system is configured to disable the output device based on certain conditions of the refuse vehicle.

20 Claims, 10 Drawing Sheets

U.S. PATENT DOCUMENTS

| | | |
|---|---|---|
| 4,864,151 A | 9/1989 | Wyczalek et al. |
| 4,864,154 A | 9/1989 | Copeland et al. |
| 4,864,568 A | 9/1989 | Sato et al. |
| 4,894,781 A | 1/1990 | Sato et al. |
| 4,941,546 A | 7/1990 | Nist et al. |
| 4,949,808 A | 8/1990 | Garnett |
| 5,025,253 A | 6/1991 | DiLullo et al. |
| 5,062,759 A | 11/1991 | Pieperhoff |
| 5,071,307 A | 12/1991 | Carson |
| 5,091,856 A | 2/1992 | Hasegawa et al. |
| 5,189,617 A | 2/1993 | Shiraishi |
| 5,202,830 A | 4/1993 | Tsurumiya et al. |
| 5,215,423 A | 6/1993 | Schulte-Hinsken et al. |
| 5,222,853 A | 6/1993 | Carson |
| 5,299,129 A | 3/1994 | Uchida et al. |
| 5,301,997 A | 4/1994 | Cudden |
| 5,343,675 A | 9/1994 | Norton |
| 5,365,436 A | 11/1994 | Schaller et al. |
| 5,416,702 A | 5/1995 | Kitagawa et al. |
| 5,418,437 A | 5/1995 | Couture et al. |
| 5,463,992 A | 11/1995 | Swenson et al. |
| 5,470,187 A | 11/1995 | Smith et al. |
| 5,508,689 A | 4/1996 | Rado et al. |
| 5,540,037 A | 7/1996 | Lamb et al. |
| 5,553,673 A | 9/1996 | Hackman |
| 5,555,171 A | 9/1996 | Sonehara et al. |
| 5,557,257 A | 9/1996 | Gieffers |
| 5,568,023 A | 10/1996 | Grayer et al. |
| 5,595,398 A | 1/1997 | Brown |
| 5,601,392 A | 2/1997 | Smith et al. |
| 5,623,169 A | 4/1997 | Sugimoto et al. |
| 5,637,933 A | 6/1997 | Rawlings et al. |
| 5,638,272 A | 6/1997 | Minowa et al. |
| 5,657,224 A | 8/1997 | Lonn et al. |
| 5,670,845 A | 9/1997 | Grant et al. |
| 5,673,017 A | 9/1997 | Dery et al. |
| 5,700,026 A | 12/1997 | Zalewski et al. |
| 5,736,925 A | 4/1998 | Knauff et al. |
| 5,739,592 A | 4/1998 | Rigsby et al. |
| 5,754,021 A | 5/1998 | Kojima |
| 5,793,648 A | 8/1998 | Nagle et al. |
| 5,794,165 A | 8/1998 | Minowa et al. |
| 5,816,766 A | 10/1998 | Clark |
| 5,819,188 A | 10/1998 | Vos |
| 5,827,957 A | 10/1998 | Wehinger |
| 5,845,221 A | 12/1998 | Hosokawa et al. |
| 5,848,365 A | 12/1998 | Coverdill |
| 5,851,100 A | 12/1998 | Brandt |
| 5,856,976 A | 1/1999 | Hirano |
| 5,864,781 A | 1/1999 | White |
| 5,884,206 A | 3/1999 | Kim |
| 5,890,080 A | 3/1999 | Coverdill et al. |
| 5,890,865 A | 4/1999 | Smith et al. |
| 5,896,418 A | 4/1999 | Hamano et al. |
| 5,919,237 A | 7/1999 | Balliet |
| 5,948,025 A | 9/1999 | Sonoda |
| 5,949,330 A | 9/1999 | Hoffman et al. |
| 5,954,470 A | 9/1999 | Duell et al. |
| 5,957,985 A | 9/1999 | Wong et al. |
| 5,987,365 A | 11/1999 | Okamoto |
| 5,997,338 A | 12/1999 | Pohjola |
| 5,999,104 A | 12/1999 | Symanow et al. |
| 6,012,004 A | 1/2000 | Sugano et al. |
| 6,033,041 A | 3/2000 | Koga et al. |
| 6,038,500 A | 3/2000 | Weiss |
| 6,059,058 A | 5/2000 | Dower |
| 6,065,565 A | 5/2000 | Puszkiewicz et al. |
| 6,070,538 A | 6/2000 | Flamme et al. |
| 6,075,460 A | 6/2000 | Minissale et al. |
| 6,091,162 A | 7/2000 | Williams et al. |
| 6,096,978 A | 8/2000 | Pohjola |
| 6,123,497 A | 9/2000 | Duell et al. |
| 6,135,806 A | 10/2000 | Pohjola |
| 6,141,610 A | 10/2000 | Rothert et al. |
| 6,152,673 A | 11/2000 | Anderson et al. |
| 6,154,122 A | 11/2000 | Menze |
| 6,182,807 B1 | 2/2001 | Saito et al. |
| 6,223,104 B1 | 4/2001 | Kamen et al. |
| 6,230,496 B1 | 5/2001 | Hofmann et al. |
| 6,263,269 B1 | 7/2001 | Dannenberg |
| 6,269,295 B1 | 7/2001 | Gaugush et al. |
| 6,323,565 B1 | 11/2001 | Williams et al. |
| 6,331,365 B1 | 12/2001 | King |
| 6,332,745 B1 | 12/2001 | Duell et al. |
| 6,338,010 B1 | 1/2002 | Sparks et al. |
| 6,356,826 B1 | 3/2002 | Pohjola |
| 6,404,607 B1 | 6/2002 | Burgess et al. |
| 6,405,114 B1 | 6/2002 | Priestley et al. |
| 6,421,593 B1 * | 7/2002 | Kempen et al. ............... 701/48 |
| 6,430,164 B1 | 8/2002 | Jones et al. |
| 6,430,488 B1 | 8/2002 | Goldman et al. |
| 6,433,442 B1 | 8/2002 | Maeckel et al. |
| 6,434,512 B1 | 8/2002 | Discenzo |
| 6,482,124 B2 | 11/2002 | Hormann et al. |
| 6,496,775 B2 | 12/2002 | McDonald et al. |
| 6,501,368 B1 | 12/2002 | Wiebe et al. |
| 6,522,955 B1 | 2/2003 | Colborn |
| 6,553,290 B1 | 4/2003 | Pillar |
| 6,580,953 B1 | 6/2003 | Wiebe et al. |
| 6,611,755 B1 | 8/2003 | Coffee et al. |
| 6,648,367 B2 | 11/2003 | Breed et al. |
| 6,732,035 B2 | 5/2004 | Miller et al. |
| 6,733,036 B2 | 5/2004 | Breed et al. |
| 6,757,597 B2 | 6/2004 | Yakes et al. |
| 6,761,370 B2 | 7/2004 | Colet |
| 6,865,460 B2 | 3/2005 | Bray et al. |
| 6,882,917 B2 | 4/2005 | Pillar et al. |
| 6,885,920 B2 | 4/2005 | Yakes et al. |
| 6,909,944 B2 | 6/2005 | Pillar et al. |
| 6,917,288 B2 | 7/2005 | Kimmel et al. |
| 6,922,615 B2 | 7/2005 | Pillar et al. |
| 6,928,358 B2 | 8/2005 | Brooks et al. |
| 6,993,421 B2 | 1/2006 | Pillar et al. |
| 7,006,902 B2 | 2/2006 | Archer et al. |
| 7,024,296 B2 | 4/2006 | Squires et al. |
| 7,072,745 B2 | 7/2006 | Pillar et al. |
| 7,107,129 B2 | 9/2006 | Rowe et al. |
| 7,127,331 B2 | 10/2006 | Pillar et al. |
| 7,162,332 B2 | 1/2007 | Pillar et al. |
| 7,164,977 B2 | 1/2007 | Yakes et al. |
| 7,184,862 B2 | 2/2007 | Pillar et al. |
| 7,184,866 B2 | 2/2007 | Squires et al. |
| 7,254,468 B2 | 8/2007 | Pillar et al. |
| 7,277,782 B2 | 10/2007 | Yakes et al. |
| 7,302,320 B2 | 11/2007 | Nasr et al. |
| 2002/0112688 A1 | 8/2002 | Fariz et al. |
| 2003/0031543 A1 | 2/2003 | Elbrink |
| 2003/0085562 A1 | 5/2003 | Sparling |
| 2003/0151526 A1 * | 8/2003 | Tanaka et al. ............ 340/932.2 |
| 2003/0156020 A1 * | 8/2003 | Masuda .................... 340/435 |
| 2003/0158635 A1 | 8/2003 | Pillar et al. |
| 2003/0165255 A1 * | 9/2003 | Yanagawa et al. ........... 382/104 |
| 2003/0195680 A1 | 10/2003 | Pillar |
| 2003/0200015 A1 | 10/2003 | Pillar |
| 2003/0205422 A1 | 11/2003 | Morrow et al. |
| 2004/0055802 A1 | 3/2004 | Pillar et al. |
| 2004/0124697 A1 * | 7/2004 | MacGregor et al. ........... 303/89 |
| 2004/0133319 A1 | 7/2004 | Pillar et al. |
| 2004/0199302 A1 | 10/2004 | Pillar et al. |
| 2005/0004733 A1 | 1/2005 | Pillar et al. |
| 2005/0038934 A1 | 2/2005 | Gotze et al. |
| 2005/0050872 A1 * | 3/2005 | Kempf ...................... 56/11.3 |
| 2005/0113996 A1 | 5/2005 | Pillar et al. |
| 2005/0119806 A1 | 6/2005 | Nasr et al. |

| | | | |
|---|---|---|---|
| 2005/0131600 | A1 | 6/2005 | Quigley et al. |
| 2005/0234622 | A1 | 10/2005 | Pillar et al. |
| 2006/0201121 | A1* | 9/2006 | Straka et al. ............ 56/10.2 R |
| 2006/0226675 | A1* | 10/2006 | Dunn .......................... 296/75 |
| 2007/0172341 | A1* | 7/2007 | Gregory .................... 414/495 |
| 2007/0251737 | A1* | 11/2007 | Straka et al. .............. 180/53.6 |
| 2008/0027599 | A1* | 1/2008 | Logan et al. ................. 701/23 |
| 2008/0100704 | A1* | 5/2008 | Venetianer et al. .......... 348/143 |
| 2008/0137589 | A1* | 6/2008 | Barrett ...................... 370/327 |
| 2009/0109049 | A1* | 4/2009 | Frederick et al. ........ 340/686.6 |

FOREIGN PATENT DOCUMENTS

| | | |
|---|---|---|
| DE | 101 03 922 A1 | 8/2002 |
| EP | 0 266 704 B1 | 5/1988 |
| EP | 0 496 302 A1 | 7/1992 |
| EP | 0 504 913 A1 | 9/1992 |
| EP | 0 564 943 B1 | 10/1993 |
| EP | 0 630 831 A1 | 12/1994 |
| EP | 0 791 506 A2 | 8/1997 |
| EP | 0 894 739 A1 | 2/1999 |
| EP | 1 229 636 A2 | 8/2002 |
| SE | 507046 C2 | 3/1998 |
| WO | WO-93/10591 A1 | 5/1993 |
| WO | WO-93/10951 A1 | 6/1993 |
| WO | WO-95/15594 A1 | 6/1995 |
| WO | WO-96/32346 A1 | 10/1996 |
| WO | WO-96/40573 A1 | 12/1996 |
| WO | WO-97/02965 A1 | 1/1997 |
| WO | WO-98/30961 A1 | 7/1998 |
| WO | WO-00/69662 A1 | 11/2000 |
| WO | WO-2004/052756 A1 | 6/2004 |
| WO | WO-2005/030614 A1 | 4/2005 |

OTHER PUBLICATIONS

"HEMTT—Heavy Expanded Mobility Tactical Truck M977 Series Truck," Product of Oshkosh Truck Corporation, Mar. 2000 (12 pgs. as photocopied).

"LHS Decontamination Mission Module," Product of Oshkosh Truck Corporation, see IDS for date (2 pgs. as photocopied).

"LVS—Logistic Vehicle System (MK48 Series)," Product of Oshkosh Truck Corporation, see IDS for date information (6 pgs.).

"M1070F Heavy Equipment Transporter & Trailer"; Product of Oshkosh Truck Corporation, Sep. 2001 (8 pgs. as photocopied).

"M1977 CBT (Common Bridge Transporter)," Product of Oshkosh Truck Corporation, see IDS for date information (2 pgs. as photocopied).

"Medium Tactical Vehicle Replacement," Product of Oshkosh Truck Corporation, Aug. 2000 (6 pgs. as photocopied).

"MTVR Dump Body Variant (Medium Tactical Vehicle Replacement)," Product of Oshkosh Truck Corporation, Sep. 2001 (2 pgs. as photocopied).

"MTVR Wrecker Variant (MK36 Wrecker Recovery Vehicle)," Product of Oshkosh Truck Corporation, Sep. 2001 (2 pgs. as photocopied).

"Oshkosh Demonstrates ProPulse, the First Electric Hybrid—Drive Heavy Defense Truck," Oshkosh Truck Corp., Feb. 27, 2000 (2 pgs.).

"Oshkosh Receives Federal Government Funding to Develop ProPulse Alternative Drive System for Military Trucks," Oshkosh Truck Corp., Aug. 31, 2001 (2 pgs.).

"Oshkosh Showcases ProPulse Hybrid Electric System at Major Defense Exhibition," Oshkosh Truck Corp., Oct. 21, 2002 (1 pg.).

"Oshkosh Truck and Ohio State University Design Robotic Vehicle to Compete in Desert Race," Oshkosh Truck Corp., Feb. 11, 2004 (2 pgs.).

"Oshkosh Truck Awarded Contract for U.S. Army Future Tactical Truck Concepts and Technology Evaluations," Oshkosh Truck Corp., Dec. 2, 2003 (2 pgs.).

"Oshkosh Truck Rolls Out Next Generation of Command Zone Advanced Electronics System to Military Market," Oshkosh Truck Corp., Oct. 21, 2002 (2 pgs.).

"Oshkosh Trucks—75 Years of Specialty Truck Production," Wright et al., Motorbooks International Publishers & Wholesalers, 1992, pp. 119-126 (10 pgs.).

"Oshkosh Truck's Robotic Truck Qualifies for Pentagon's $1 Million Desert Race," Oshkosh Truck Corp., Mar. 12, 2004 (2 pgs.).

"Palletized Load System (PLS)—Concrete Mobile Mixer Module," Product of Oshkosh Truck Corporation, see IDS for date information (2 pgs.).

"Palletized Load System (PLS)—Potable Water Distributor Module," Product of Oshkosh Truck Corporation, see IDS for date information (2 pgs.).

"The One to Count on Through Hell and High Water," Product of Oshkosh Truck Corporation, Sep. 2000 (4 pgs.).

Aircraft Internal Time Division Multiplex Data Bus, MIL-STD-1553 (USAF), Aug. 30, 1973 (29 pgs.).

Instruction and Parts Manual, Machine type: GCB 1000 SPLIT, May 23, 2002, 80 pages, Geesink Norba Group.

Instruction and Parts Manual, Machine type: GPM IIe, Jul. 10, 2002, 74 pages, Geesink Norba Group.

Instruction Manual for the Training AS-i bus, Aug. 2002, 31 pages, Version 3.0, Geesink Norba Group.

* cited by examiner

REFUSE VEHICLE CONTROL SYSTEM AND METHOD WITH FOOTBOARD

CROSS-REFERENCE TO RELATED PATENT APPLICATIONS

This application is a continuation of U.S. Ser. No. 10/668,002, filed Sep. 22, 2003, entitled "Refuse Vehicle Control System and Method," pending, which is a continuation-in-part of U.S. Ser. No. 10/314,918, filed Dec. 9, 2002, entitled "Refuse Vehicle Control System and Method," now U.S. Pat. No. 7,072,745, which is hereby expressly incorporated by reference.

BACKGROUND

The present disclosure relates generally to the field of refuse vehicles. More specifically, the present disclosure relates to control systems for refuse vehicles.

Various vehicles are known for handling refuse (e.g., collecting refuse, transporting refuse, etc.). Such vehicles may include front loaders, side loaders, rear loaders, bucket loaders, etc. These refuse vehicles are generally configured to collect refuse from a refuse bin and put it in a container on the vehicle for transport to another location such as a landfill or transfer station. Refuse vehicles are generally made in a variety of configurations to meet the requirements imposed by the particular refuse bins (e.g., bin on wheels, residential refuse can, etc.) and physical limits of the areas in which the refuse is collected (e.g., the width and height of an alley where refuse is stored).

A need exists for a way to monitor the various aspects and operations of a refuse vehicle and, based on the information obtained, prevent or disable certain operations of the refuse vehicle. Also, a need exists for a refuse vehicle that is able to effectively enable and disable various operations of the refuse vehicle in a manner that is timely and does not interfere or slow down the process of collecting the refuse.

Accordingly, it would be desirable to provide a refuse vehicle that provides one or more of these features. Other features and advantages will be made apparent from the present description. The teachings disclosed extend to those embodiments that fall within the scope of the appended claims, regardless of whether they provide one or more of the aforementioned advantages or overcome one of the aforementioned disadvantages.

SUMMARY

According to an exemplary embodiment, a refuse vehicle comprises a transmission and a control system. The control system comprises a plurality of microprocessor based interface modules, a communication network configured to interconnect the plurality of interface modules, and at least one output device. The control system is configured to disable the output device when the transmission is in gear.

According to another exemplary embodiment, a refuse vehicle comprises a control system. The control system comprises a plurality of microprocessor based interface modules, a communication network configured to interconnect the plurality of interface modules, and at least one output device. The control system is configured to disable the output device when the refuse vehicle reaches a threshold speed.

According to another exemplary embodiment, refuse vehicle comprises a footboard and a control system. The control system includes a plurality of microprocessor based interface modules, a communication network configured to interconnect the plurality of interface modules, and at least one output device. The control system is configured to disable the output device when a person is positioned on the footboard.

According to another exemplary embodiment, a refuse vehicle comprises a control system. The control system comprises a plurality of microprocessor based interface modules, a communication network configured to interconnect the plurality of interface modules, and at least one output device. The control system is configured to disable the output device when the refuse vehicle is moving in reverse.

According to another exemplary embodiment, a refuse vehicle comprises a chassis, a body, and a control system. The chassis includes an engine and a transmission. The body includes a footboard. The control system comprises a plurality of microprocessor based interface modules and a communication network configured to interconnect the plurality of interface modules. The control system is configured to shut the engine off when the transmission is in reverse and a person is positioned on the footboard.

According to another exemplary embodiment, a refuse vehicle comprises a chassis, a body, and a control system. The body includes a hydraulic oil reservoir. The control system comprises a plurality of microprocessor based interface modules, a communication network configured to interconnect the plurality of interface modules, and a hydraulic output device. The control system is configured to disable the hydraulic output device when the hydraulic oil reservoir is low.

According to another exemplary embodiment a refuse vehicle comprises a chassis, a body, and a control system. The body includes a refuse handling device. The control system comprises a plurality of microprocessor based interface modules and a communication network configured to interconnect the plurality of interface modules. The control system is configured to prevent the refuse vehicle from exceeding a threshold speed when the refuse handling device is in a working position.

According to another exemplary embodiment, a refuse vehicle comprises a chassis, a body, a lubrication system, and a control system. The lubrication system is configured to lubricate components of the body of the refuse vehicle. The control system comprises a plurality of microprocessor based interface modules and a communication network configured to interconnect the plurality of interface modules. The control system is configured to initiate a lubrication cycle at periodic intervals.

According to another exemplary embodiment, a refuse vehicle comprises a control system. The control system comprises a plurality of microprocessor based interface modules and a communication network configured to interconnect the plurality of interface modules. The control system is configured to prevent the refuse loader from initiating a refuse handling operation when the vehicle is moving, the control system being configured to allow, when the vehicle is moving, the refuse loader to complete the refuse handling operation initiated when the vehicle was not moving.

According to another exemplary embodiment, a refuse vehicle comprises a chassis which includes a transmission, a body, and a control system. The control system comprises a plurality of input devices, a plurality of output devices, a plurality of microprocessor based interface modules, and a communication network. The plurality of input devices includes a camera. The plurality of output devices includes a display. The plurality of interface modules are interconnected to each other by way of the communication network. Each of the plurality of interface modules is coupled to respective ones of the plurality of input devices and the plurality of output devices. The plurality of interface modules store I/O status information for the plurality of input devices and the plurality of output devices. The control system is configured to display at least one image of an area to the rear of the refuse vehicle on the display when the transmission of the refuse vehicle is in reverse and/or when the refuse vehicle is moving in reverse.

According to another exemplary embodiment, a refuse vehicle comprises a control system. The control system comprises a plurality of input devices, a plurality of output devices, a plurality of microprocessor based interface modules, and a communication network. The plurality of input devices includes an emergency stop. The plurality of interface modules are interconnected to each other by way of the communication network. Each of the plurality of interface modules is coupled to respective ones of the plurality of input devices and the plurality of output devices. The plurality of interface modules storing I/O status information for the plurality of input devices and the plurality of output devices. The control system is configured to disable the plurality of output devices when the emergency stop is activated.

According to another exemplary embodiment, a method for controlling a refuse vehicle comprises disabling a plurality of output devices of the refuse vehicle when a transmission of the refuse vehicle is in gear, enabling the plurality of output devices when a brake of the refuse vehicle is engaged, disabling the plurality of output devices when the brake pedal is disengaged, All three steps are performed by a control system that comprises a plurality of microprocessor based interface modules. The plurality of interface modules are interconnected by way of a communication network.

DETAILED DESCRIPTION

Figure 1:
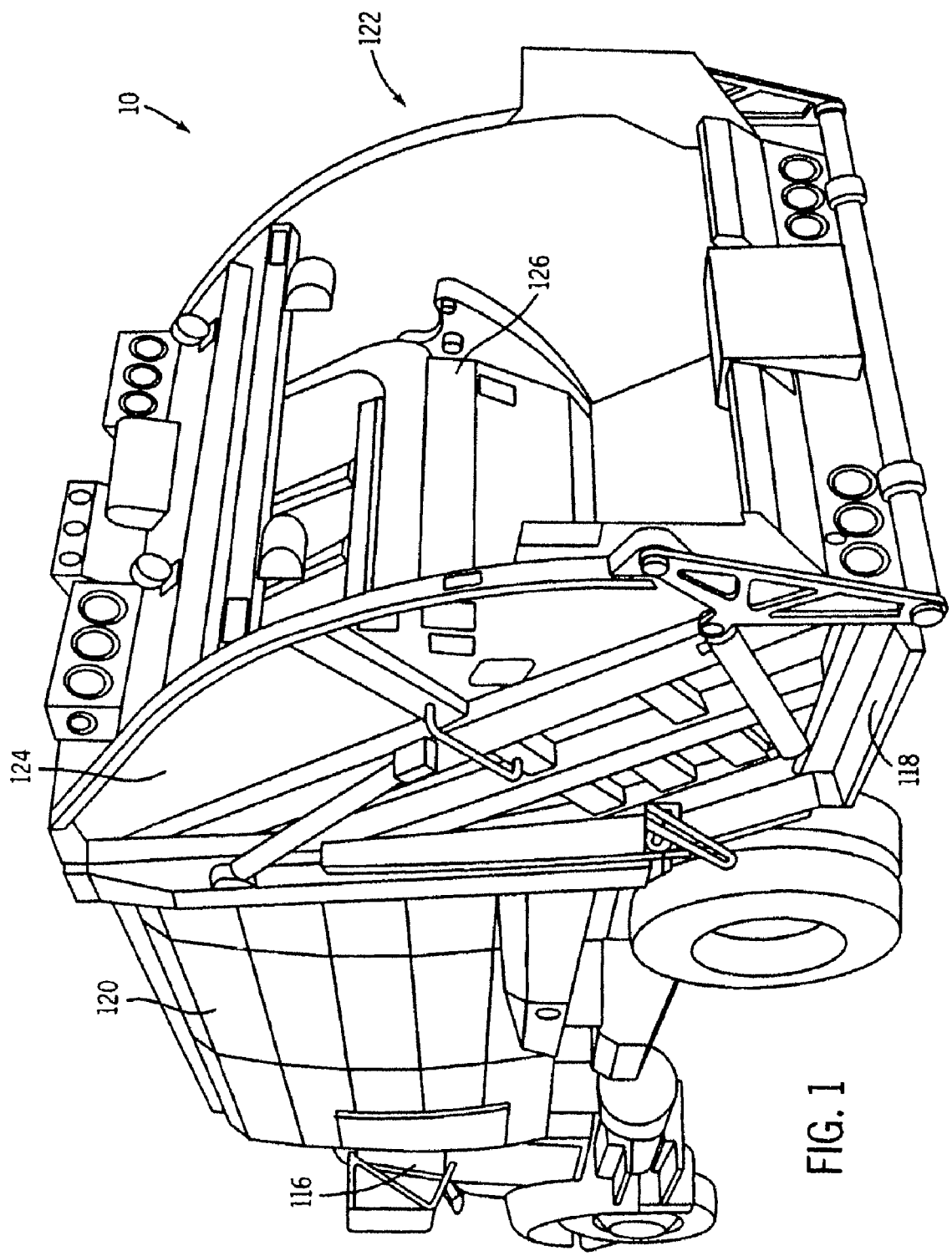
FIG. 1 is a rear perspective view of a refuse vehicle according to an exemplary embodiment.

Referring to FIG. 1, an exemplary embodiment of a refuse vehicle 10 is illustrated. As an overview, refuse vehicle 10 includes a chassis and a body mounted on the chassis. Consistent with its plain and ordinary meaning, the term "chassis" is used herein to refer to the combination of components of a refuse vehicle that function to move the refuse vehicle along a road (e.g., drive train, engine, transmission, drive axles, wheels, frame, etc.). Also consistent with its plain and ordinary meaning, the term "body" is used herein to refer to the components of a refuse vehicle that are not considered part of the chassis. This generally includes, but is not limited to, refuse handling devices (e.g., refuse loader, refuse container, refuse compactor, refuse push-out plate, other devices and systems that function to collect and handle refuse, etc.), etc.

Refuse vehicle 10 includes an operator compartment 116 that further includes steering, throttle, and transmission controls for receiving operator inputs to control the movement of refuse vehicle 10 along a road. These controls may include a clutch pedal, a brake pedal, transmission shifter, steering wheel, accelerator, etc. Refuse vehicle 10 may include a manual, automatic, hydrostatic, or hybrid (e.g., operator maneuvers a gear shifter but does not need to press the clutch, etc.) transmission.

Refuse vehicle 10 is shown in FIG. 1 as a rear loading refuse vehicle. However, it should be understood that refuse vehicle 10 may be any of a number of refuse vehicles. For example, refuse vehicle 10 may be a side loader, front loader, bucket loader, automated side loader, etc. Accordingly, the teachings herein do not depend on the exact size, configuration, construction, or assembly of refuse vehicle 10.

In the particular embodiment shown in FIG. 1, refuse vehicle 10 includes footboard 118, refuse container 120, hopper 122, tailgate 124, push-out plate (not shown), and compactor 126. Of course, the type and configuration of components depends on the particular refuse vehicle that is being used. For example, hopper 122 shown in FIG. 1 is at the rear of refuse vehicle 10. However, on a front loading refuse vehicle, hopper 122 is configured to be above and slightly behind operator compartment 116.

The person or persons that load the refuse into hopper 122 (or perform other tasks) ride on footboard 118 as refuse vehicle travels between stops. Although refuse vehicle 10 depicts footboard 118 on the tailgate at the rear of refuse vehicle 10, footboard 118 may also be positioned in any suitable location (e.g., directly behind operator compartment 116, etc.).

Once the refuse is placed in hopper 122, compactor 126 is used to move the refuse into refuse container 120 and compact it. When container 120 is full, tailgate 124 is raised and the refuse is pushed out of container 120 by the push-out plate. The push-out plate is generally configured to be inside container 120. When the push-out plate is not in use it is positioned near the front wall of container 120.

Figure 2:
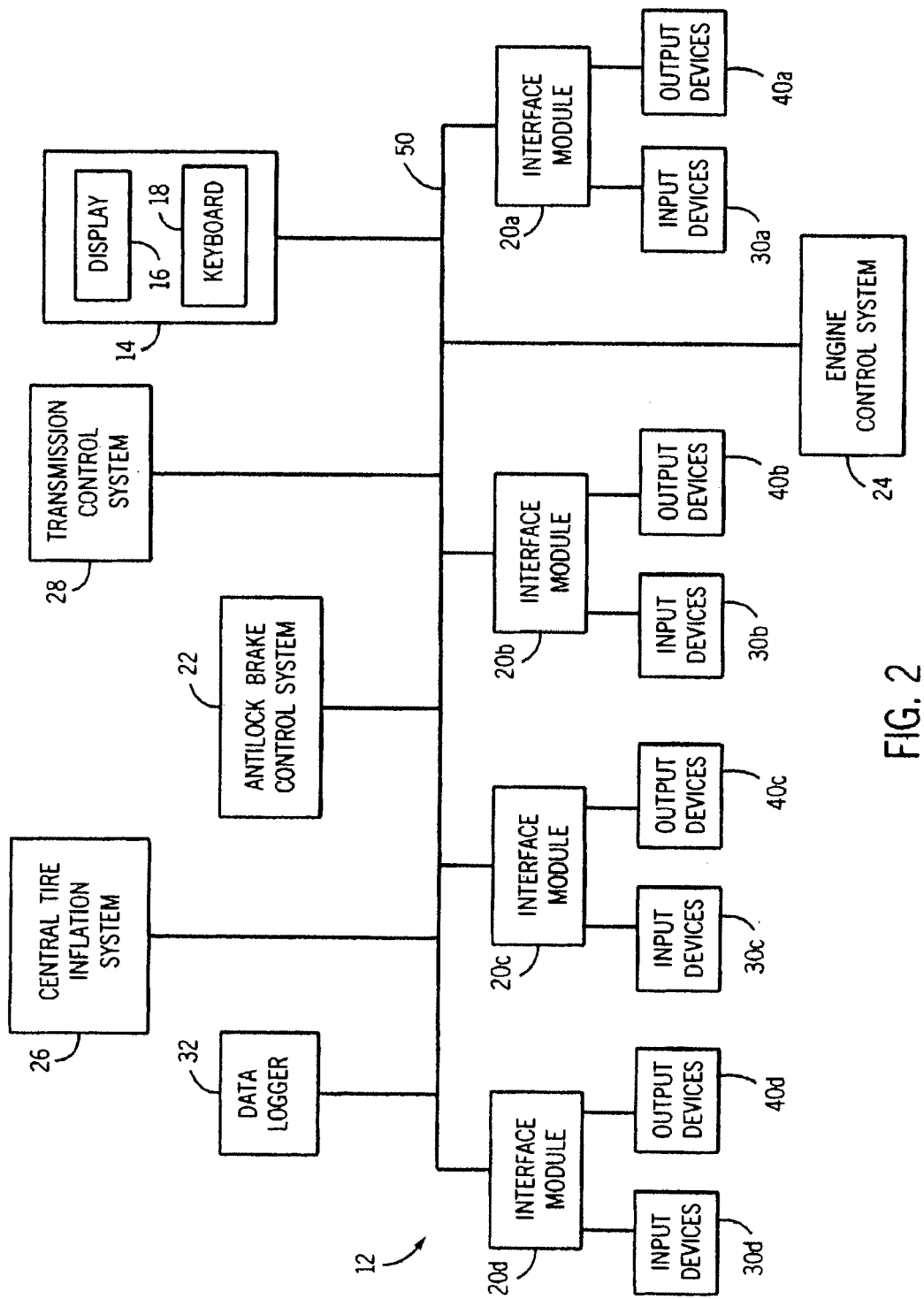
FIG. 2 is a control system for a refuse vehicle according to an exemplary embodiment.

In an exemplary embodiment, refuse vehicle 10 includes a control system 12, as shown in FIG. 2. By way of overview, the electronic control system 12 includes an operator interface 14, a plurality of microprocessor-based interface modules 20a-20d (collectively referred to as interface modules 20), a plurality of input devices 30a-30d (collectively referred to as input devices 30), a plurality of output devices 40a-40d (collectively referred to as output device 40), a data logger 32, and a plurality of additional vehicle subsystem control systems 22, 24, 26, and 28. Operator interface 14 and interface modules 20 are coupled to each other by a communication network 50.

Control system 12 may be configured in a number of different ways. For example, control system 12 may be configured to include multiple control systems that are coupled together. An example of such a configuration may be a refuse vehicle having one control system to control the chassis and another control system to control the body. Also, control system 12 may be configured to include multiple nested control systems so that control system 12 may include a smaller control system that forms a part of the overall control system 12. Thus, it should be understood that the particular configuration of control system 12 shown in FIG. 2 is only one of many possible embodiments.

As mentioned above, refuse vehicle 10 may be any of a number of refuse vehicles that are capable of using and benefiting from control system 12 as disclosed herein. While the general diagram of refuse vehicle 10 in FIG. 1 is of a rear loader, the vehicle 10 may also be another type of refuse vehicle. The advantages of control system 12, which are described using the example of refuse vehicle 10, may apply equally to a vast array of other refuse vehicles. Thus, embodiments and examples of control system 12 described in the context of a rear loading refuse vehicle are equally applicable to other refuse vehicles such as front loaders, side loaders, etc.

Referring to FIG. 2, in an exemplary embodiment, interface modules 20 are microprocessor-based and include a plurality of analog and/or digital inputs and outputs which are coupled to and communicate with input and output devices 30 and 40, respectively. In general, in order to minimize wiring, the interface modules 20 are placed close to input devices 30, from which status information is received, and output devices 40 that are controlled. In one embodiment, interface modules 20 are coupled to input and output devices 30 and 40 via a dedicated communication link, which may simply be a hardwired link between an interface module 20 and an input or output device 30 or 40. In an alternative embodiment, input or output devices 30 or 40 may be coupled directly to communication network 50 and configured to communicate directly over communication network 50 to all of the interface modules (e.g., the status of the device is broadcast over the network), one interface module (e.g., the interface module requested information from the particular input or output device 30 or 40), or a subset of interface modules on the network.

In an exemplary embodiment, interface modules 20 are identical both in software, hardware, and physical dimensions. Thus, interface modules 20 are physically and functionally interchangeable because they are capable of being plugged in at any slot on communication network 50, and are capable of performing any functions that are required at that slot. In an alternative embodiment, interface modules 20 may be different in software, hardware, and/or physical dimensions. Using interface modules 20 with different configurations allows the interface modules 20 to be constructed in a manner which is more narrowly tailored to the functions performed.

In an exemplary embodiment, each of the interface modules 20 stores I/O status information for all of the other interface modules 20. In this configuration, each interface module has total system awareness. As a result, each interface module 20 processes its own inputs and outputs based on the I/O status information. The I/O status information may be provided to interface modules 20 in a number of ways. For example, in an exemplary embodiment, each of interface modules 20 may be configured to broadcast the status of input devices 30 over communication network 50 to the other interface modules 20 at predetermined intervals. In another exemplary embodiment, interface modules 20 may be configured to simultaneously or sequentially broadcast the status information to the other interface modules 20. In another exemplary embodiment, interface modules 20 may be configured to broadcast the status information in response to a change in the state of an input device 30. This lessens the amount of traffic over communication network 50. In another exemplary embodiment, one interface module 20 may be designated the master controller which is configured to control the input and output devices coupled to the remaining interface modules 20. In this embodiment, the master controller is typically configured to be the only interface module that stores the I/O status information. However, in may be desirable for the other interface modules that do not function as the master controller to store part (e.g., I/O status information related to the devices they control) or all of the I/O status information. Of course, any of these embodiments may be combined. For example, each of interface modules 20 may be configured to broadcast at predetermined intervals and in response to a change in the state of one of input devices 30.

In another exemplary embodiment, as mentioned previously, some of the input and/or output devices 30 or 40 may be coupled directly to communication network 50. In this configuration, the input devices 30 may broadcast status information across network 50 to interface modules 20 and control signals may be transmitted to output devices 40. Thus, one or more of interface modules 20 may be configured to control output devices 40 coupled directly to communication network 50. Input and/or output devices 30 or 40 coupled directly to communication network 50 typically do not store the status information broadcast across the network for other I/O devices. However, in an alternative embodiment, input and/or output devices 30 or 40 may be configured to store the status information broadcast by the other interface modules 20 and/or other devices on communication network 50.

Communication network 50 may be implemented using an appropriate network protocol. In an exemplary embodiment, communication network 50 uses a network protocol that is in compliance with the Society of Automotive Engineers (SAE) J1708/1587 and/or J1939 standards. However, the particular network protocol that is utilized is not critical, although all of the devices on the network should be able to communicate effectively and reliably.

The transmission medium for communication network 50 may be implemented using copper or fiber optic cable or other media. Communication network 50 may be configured in a number of ways. For example, in an exemplary embodiment, network 50 may be a single network. In another exemplary embodiment, network 50 may be comprised of multiple networks coupled together.

Power is provided to interface modules 20 from a power source by way of a power transmission link. The power transmission link may comprise, for example, a power line that is routed throughout vehicle 10 to each of interface modules 20. Interface modules 20 then distribute the power to output devices 40 (e.g., to form the dedicated communication links as previously mentioned). This type of distributed power transmission dramatically reduces the amount of wiring needed for vehicle 10. In an exemplary embodiment, interface modules 20 are configured to provide power outputs to output devices 40 that are capable of carrying currents no less than approximately 2 amps, 5 amps, 10 amps, or, desirably, 15 amps.

Input devices 30 and output devices 40 are generally located throughout vehicle 10. Input and output devices 30 and 40 may be further divided according to whether input and output devices 30 and 40 pertain to the chassis or the body of vehicle 10. Hereinafter, input and output devices 30 and 40 pertaining to the body are referred to as body input and output devices (e.g., input device that determines whether refuse container 120 is full, output device that actuates the refuse loader, etc.) and input and output devices 30 and 40 pertaining to the chassis are referred to as chassis input and output devices (e.g., input device that measures the speed of vehicle 10, output device that controls the state of the transmission, etc.). Input and output devices 30 and 40 are used to perform various operations (e.g., body operations such as loading refuse, chassis operations such as the cruise control, etc.).

Input and output devices 30 and 40 may be any of a number of devices that are conventionally used to receive inputs and control outputs. In an exemplary embodiment, input devices 30 include devices that provide inputs used to control output devices 40. Also, input devices 30 may include devices that provide status information pertaining to vehicle parameters that are not used to control output devices 40 but may be used for other purposes (e.g., diagnosing faults in vehicle 10, generating reports regarding utilization of vehicle 10, inform operator of status of a device, etc.). The type and configuration of input and output devices 30 and 40 is not critical and will depend on the type of vehicle.

Operator interface 14 shown in FIG. 1 includes a display 16 and a keypad 18. However, operator interface 14 may include any of a number of components that are used by the operator to interface with control system 12. In one embodiment, operator interface 14 includes one or more devices that are used to communicate information to the operator (e.g., display 16, LEDs, etc.) and one or more devices that the operator uses to communicate information to control system 12 (e.g., keypad 18, joystick, buttons, switches, etc.). In this manner, the operator is able to easily determine the status of input and output devices 30 and 40, and, thus, to control output devices 40, as well as other control systems and devices that are coupled to communication network 50. In an exemplary embodiment, operator interface 14 may include a microprocessor and memory so the operator can customize operator interface 14.

As shown in FIG. 2 and mentioned previously, operator interface 14 includes display 16 that is used to communicate, and, in particular, to display information to the operator. Display 16 may be one of a number of various types of displays such as an LCD display, alpha-numeric display, touch screen display, SVGA monitor, etc. Display 16 may also include memory and a microprocessor, which may serve as the memory and microprocessor for operator interface 14 or may be provided in addition to any memory or a microprocessor that operator interface 14 may otherwise include. Display 16 may be configured to provide instructions to the operator for performing various operations such as diagnostics, calibrating vehicle parameters, etc. For example, display 16 may be used to prompt the operator to enter information using keypad 18, buttons or other input device, or to take certain actions with respect to vehicle 10 during operation or testing (e.g., bring the engine to a specified RPM level). Display 16 may also be used to display a menu or series of menus to allow the operator to select an operation to perform, obtain information relating to the status of a particular input device 30 or output device 40, etc. Display 16 may also be used to display status information during system startup and during operation, and to display any error messages that may arise. Display 16 is also used to display input data and fault mode indicators from subsystem control systems 22, 24, 26, and 28, and any other information from additional vehicle subsystems. Display 16 is also capable of displaying graphics of various mechanical systems of refuse vehicle 10 so that the operator can easily ascertain the position or status of the particular vehicle component(s) (e.g., refuse loader, compactor, etc).

Operator interface 14 includes keypad 18, which is used to accept or receive operator inputs. For example, keypad 18 is used to allow the operator to scroll through and otherwise navigate menus displayed by display 16 (e.g., menus depicting the status of input devices 30 and output devices 40), and to select menu items from those menus.

In an exemplary embodiment, operator interface 14 is semi-permanently mounted with equipment service vehicle 10. By semi-permanently mounted, it is meant that the operator interface 14 is mounted within the vehicle 10 in a manner that is sufficiently rugged to withstand normal operation of the vehicle for extended periods of time (at least days or weeks) and still remain operational. However, that is not to say that operator interface 14 is mounted such that it can never be removed without significantly degrading the structural integrity of the mounting structure employed to mount operator interface 14 to the remainder of refuse vehicle 10. Operator interface 14 is desirably mounted in an operator compartment of vehicle 10, for example, in a recessed compartment within the operator compartment or on an operator panel provided on the dashboard. Also, while FIG. 2 shows one operator interface 14, it should be understood that other operator interfaces 14 may also be included as part of refuse vehicle 10. In one embodiment, another operator interface 14 may be positioned at the rear or side of refuse vehicle 10 so that a person on the outside of the refuse vehicle can observe it.

In an exemplary embodiment, operator interface 14 is configured to be an intelligent display module. By intelligent display module it is meant that operator interface is configured to include software and/or hardware so that it is capable of being coupled directly to communication network 50 without the use of one of interface modules 20. In another embodiment, operator interface may be configured to be coupled to communication network 50 by way of one of interface modules 20.

Referring again to FIG. 2, the various blocks depicting interface modules 20, input devices 30, output devices 40, operator interface 14, etc. refer to various functions incorporated into control system 12 that may be implemented as physically separate units, physically integrated units, or a combination of both. For example, data logger 32 and operator interface 14 may be physically combined in one housing that performs the same function of both data logger 32 and operator interface 14. In another embodiment, a particular input device 30 or output device 40 may be integrated physically with an interface module 20 so that the resulting combination functions in a manner that is similar to a configuration where the devices are separate yet still coupled together.

Subsystem control systems 22, 24, 26, and 28 may also be included as part of control system 12. In an exemplary embodiment depicted in FIG. 2, the subsystem control systems include an antilock brake control system 22, an engine control system 24, a central tire inflation control system 26, and transmission control system 28. Each of these is also included as part of control system 12. In another embodiment, control system 12 may include various additional subsystem control systems in a number of configurations. The subsystem control systems 22, 24, 26, and 28 may be coupled directly to the communication network 50 of control system 12, as shown in FIG. 2. Alternatively, subsystem control systems 22, 24, 26, and 28 may be coupled to one or more interface modules 20, which are coupled to communication network 50. In practice, some or all of subsystem control systems 22, 24, 26, and 28 are likely to be purchased as off-the-shelf systems. As a result, it is likely that subsystem control systems 22, 24, 26, and 28 will use a variety of different communication protocols that may need to be converted to the protocol used by communication network 50. If subsystem control systems 22, 24, 26, and 28 are coupled to communication network 50 using one or more interface modules 20, then interface modules 20 may be used to facilitate communication between network 50 and subsystem control systems 22, 24, 26, and 28 (e.g., one or more of the interface modules 20 may be coupled to multiple networks).

In general, subsystem control systems 22, 24, 26, and 28 each include an electronic control module (ECU) as well as input and/or output devices. The ECU typically includes a microprocessor that receives signal inputs and outputs related to the component controlled by the particular subsystem control system (e.g., engine, transmission, etc.). Subsystem control systems 22, 24, 26, and 28 communicate to each other using protocols such as SAE J11939, J11587, and/or J11708.

By connecting subsystem control systems 22, 24, 26, and 28 to control system 12, an array of additional input and output status information becomes available. For example, for the engine, this allows the control system 12 to obtain I/O status information pertaining to engine speed, engine hours, oil temperature, oil pressure, oil level, coolant level, fuel level, and so on. For the transmission, this allows control system 12 to obtain, for example, information pertaining to transmission temperature, transmission fluid level and/or transmission state (e.g., 1st gear, 2nd gear, and so on). Assuming that an off-the-shelf engine or transmission control system is used, the information that is available depends on the manufacturer of the system and the information that they have chosen to make available. Using this information, control system 12 may be configured in a variety of ways to provide a number of advantageous features.

In an exemplary embodiment, control system 12 is configured to control the revolutions per minute (RPM) of the power takeoff. Typically this is done by controlling the RPM of the engine. When more power is needed at the power takeoff, control system 12 increases the RPM of the engine.

Referring to FIGS. 3-14, a number of processes are shown that are controlled by control system 12. In general, control system 12 monitors the status of various input and output devices 30 and 40 as well as information received from the ECU's of subsystem control systems 22, 24, 26, and 28 to determine whether certain operations are allowed to proceed and/or output devices 40 are allowed to be actuated. Once an operation is initiated or an output device 40 is actuated, control system 12 is configured to monitor the status information for any changes and, if there are any changes, determine whether the operation should be allowed to finish or whether it should be stopped immediately.

Figure 3:
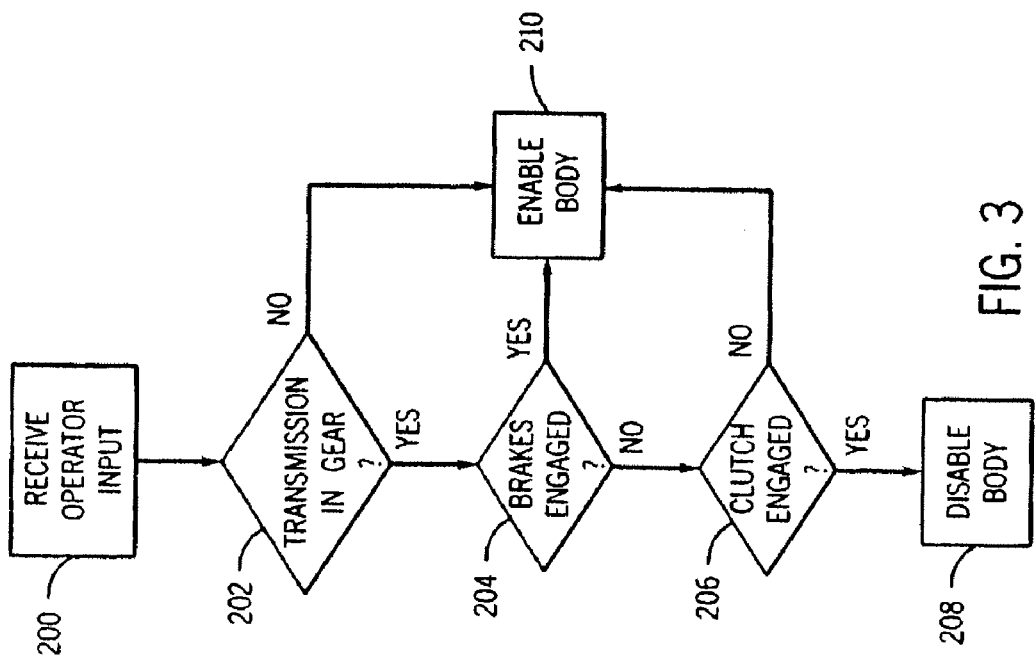
FIG. 3. is a diagram of a process for controlling a refuse vehicle according to an exemplary embodiment.

Referring to FIG. 3, a diagram is shown of an exemplary embodiment of a process for controlling refuse vehicle 10. In this embodiment, control system 12 is configured to enable or disable the body of vehicle 10 depending on the status of the transmission, brakes, and/or clutch. This configuration, for example, may be desirable to prevent body operations (e.g., refuse handling operations, etc.) from being performed and/or body output devices from being actuated in an undesirable manner. For example, when control system 12 receives an input that increased power is needed at the power takeoff, control system 12 may be configured to initially determine whether the transmission is in gear before responding to the request. If the transmission is in gear, control system 12 delays increasing the engine RPM to provide the necessary power until the transmission is not in gear or some other condition is met (e.g., the clutch is disengaged). This prevents refuse vehicle 10 from suddenly accelerating in response to a signal for increased RPM at the power takeoff. Also, by monitoring the status of the transmission and controlling the body accordingly, control system 12 can disable the body when, for example, the vehicle is traveling down a road, thus preventing undesirable movement of the body (e.g., tailgate opening and striking an overhead line, side loader arm extending and striking an object, etc.). In general, a reference to enabling or disabling the body refers to enabling or disabling one or more output devices and/or body operations. Each step in the process shown in FIG. 3 is described in greater detail below. In practice, FIG. 3 may also be performed with a single decision step implemented as a Boolean logic equation.

At step 200, control system 12 receives input from the operator. The input may be in the form of a command to perform a body operation (e.g., load refuse into refuse vehicle 10, etc.), actuate a body output device, etc. The operator uses operator interface 14 to input the command into control system 12. Control system 12 acts on the command by following the steps shown in FIG. 3 to determine whether to execute the command. In the event that the command is not executed, a notification is displayed to the operator explaining why the command was not executed (e.g., transmission in gear, etc.)

At step 202, control system 12 determines whether the transmission is in gear. In an exemplary embodiment, the status of the transmission is provided by transmission control system 28. In one embodiment, the status of the transmission is periodically broadcast over network 50 so that it is stored in memory at each of the interface modules 20. Of course, status information for the transmission may be obtained in any of the ways described above (e.g., the status of the transmission is requested from the transmission electronic control unit (ECU). Typically, a manual transmission is not in gear when it is in neutral, and an automatic transmission is not in gear when it is in park or neutral. If the transmission is not in gear then control system 12 enables the body of vehicle 10, as shown at step 210.

Typically, at step 210, all of the devices and/or operations associated with the body of refuse vehicle 10 are enabled. However, in other embodiments, only certain operations and/or devices are enabled when the transmission is not in gear.

At step 204, control system 12 determines whether the brakes are engaged. In an exemplary embodiment, control system 12 is configured to determine whether the brakes are engaged by monitoring the position of the brake pedal (e.g., determine if brakes are engaged by whether it has been depressed). For example, a sensor that is coupled to one of interface modules 20 may be used to determine the position of the brake pedal. In another example, the ECU from anti-lock brake control system 22 may provide information about the position of the brake pedal. In another exemplary embodiment, control system 12 is configured to monitor the brake assembly to determine whether the brake pads are in contact with the rotors. Again, a sensor that is coupled to one of interface modules 20 may be used to monitor the position of the brake pads and/or brake master cylinder to determine if the brake pads have contacted the rotors.

If the transmission is in gear and the brakes are engaged, then the devices and operations associated with the body of refuse vehicle 10 are enabled, as shown by step 210. Accordingly, if the operator of vehicle 10 desires to perform a refuse handling operation such as loading refuse (e.g., with a rear loader, an automatic cart tipper may be used) while the transmission is in gear (e.g., while traveling along a road collecting refuse, etc.), the operator can simply press on the brake, thus, allowing the refuse handling operation to proceed. This configuration may be particularly suitable for use with an automatic transmission.

At step 206, control system 12 determines whether the clutch is engaged. In general, the clutch is engaged when power from the engine is transferred to the transmission and wheels so that vehicle 10 can move along a road. In an exemplary embodiment, control system 12 is configured to determine whether the clutch is engaged by monitoring the position of a clutch pedal (e.g., determine if clutch is engaged by whether the clutch pedal is depressed). In another exemplary embodiment, control system 12 may be configured to monitor the position of the clutch to determine whether it is engaged with the flywheel. In another exemplary embodiment, control system 12 may be configured to monitor the position of the forks that control the position of the clutch.

If the clutch is not engaged, then the devices and/or refuse handling operations associated with the body of vehicle 10 are enabled, as shown by step 210. If the clutch is engaged, then the devices and/or refuse handling operations associated with the body of vehicle 10 are disabled, as shown by step 208.

Although, FIG. 3 shows the body of refuse vehicle 10 being enabled when either the clutch is disengaged and/or the brake is engaged, other configurations may also be used. For example, in another exemplary embodiment, control system 12 may be configured to monitor the status of only the brakes or only the clutch and control the body of refuse vehicle 10 accordingly. For example, control system 12 may be configured to enable the body only if the clutch is disengaged or only when the brake is engaged.

Figure 4:
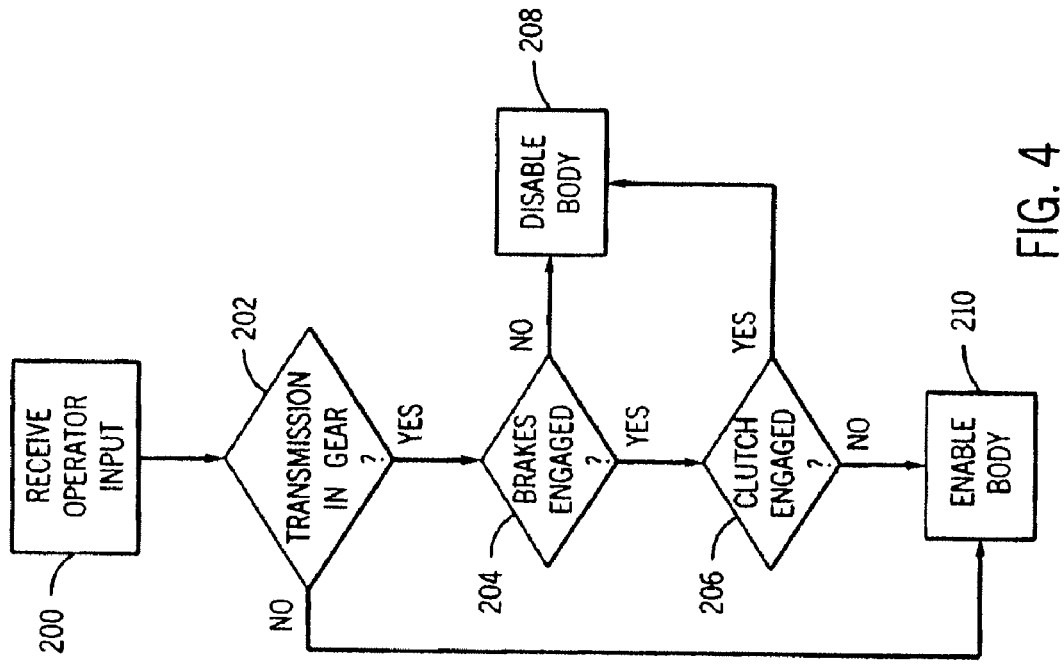
FIGS. 4-14 are diagrams of exemplary embodiments of processes for controlling a refuse vehicle.

In another exemplary embodiment, as shown in FIG. 4, control system 12 may be configured so that when the transmission is in gear, the body devices and/or operations are enabled, as shown in step 210, only if both the brake is engaged and the clutch is disengaged. If either the brake is disengaged or the clutch is engaged, then the body is disabled.

Although the embodiments described in conjunction with FIGS. 3 and 4 are particularly suitable for use with a manual transmission, these embodiments may also be used in conjunction with an automatic or other type of transmission as may be applicable. For example, in another exemplary embodiment where refuse vehicle 10 comprises an automatic transmission, control system 12 is configured to monitor the status of the brakes. If the brakes are engaged then the body devices and/or operations of refuse vehicle 10 are enabled, and, if the brakes are disengaged then the body devices and/or operations are disabled.

Figure 5:
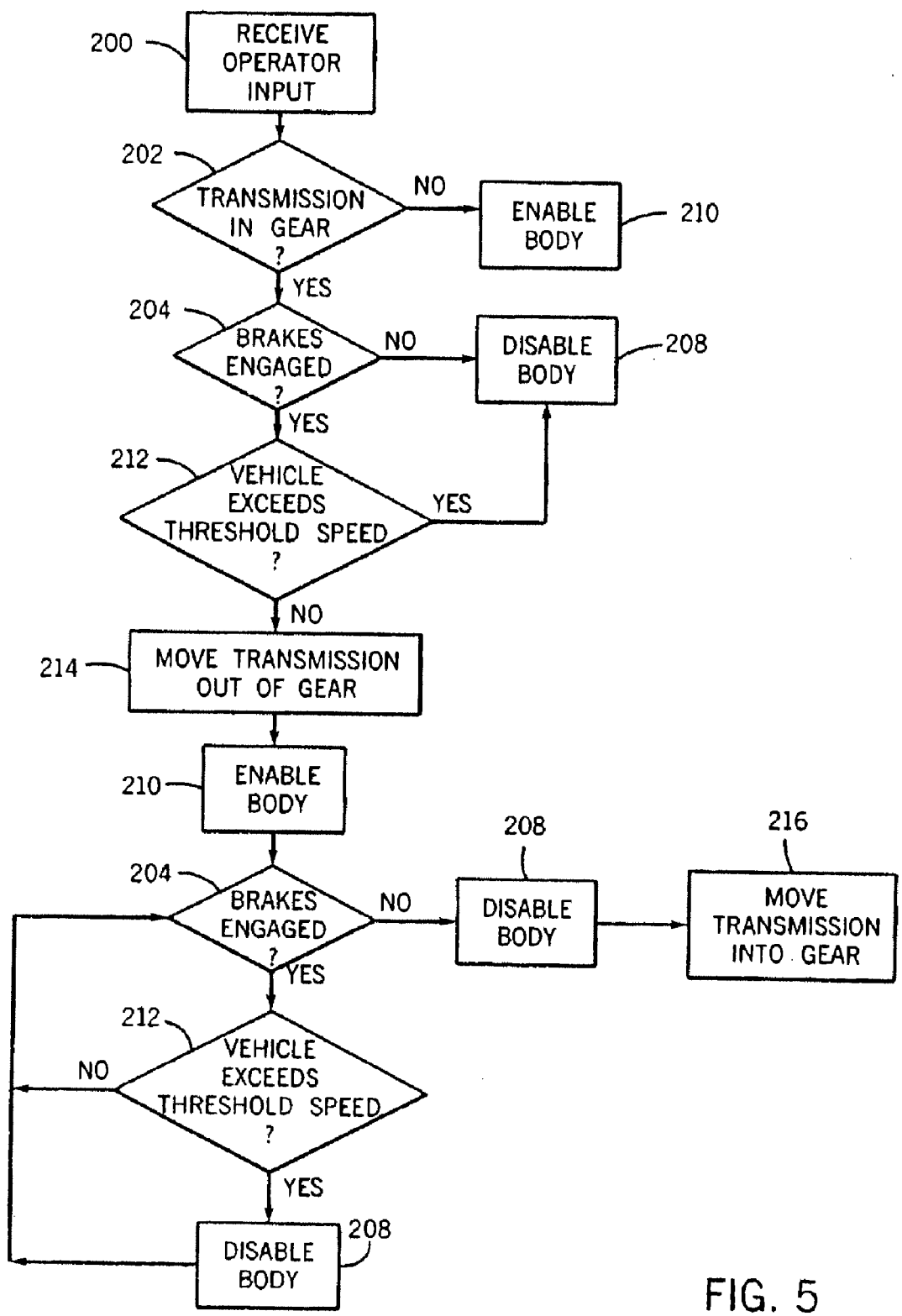

Referring to FIG. 5, an exemplary embodiment of a process for controlling refuse vehicle 10 is shown. The process shown in FIG. 5 is similar to that shown in FIG. 4 except that in FIG. 5, control system 12 is configured to move the transmission in and out of gear as the body is disabled and enabled, respectively. Also, the process shown in FIG. 5 is configured to enable the body and thus move the transmission in and out of gear only when the brakes are engaged and the speed of vehicle 10 has not exceeded a threshold speed. Each step in the process is described in more detail below.

As shown in FIG. 5, at step 202, if the transmission is in gear, then control system 12 is configured to determine whether the brake is engaged at step 204. If the brake is engaged, then control system 12 is configured to determine whether the speed of refuse vehicle 10 has exceeded a threshold speed as shown by step 212. The speed of the vehicle is information that may be communicated from an input device 30 or from the ECU of engine control system 24 to the remainder of control system 12. If the speed of vehicle 10 is above the threshold speed, then the body is disabled. If the speed of vehicle 10 is below the threshold speed, then control system 12 moves the transmission out of gear and enables the body as shown by steps 214 and 210.

Once the body is enabled, control system 12 continues to monitor the brakes and the speed of the vehicle, as shown by steps 204 and 212. If either the brakes are disengaged or the speed of the vehicle increases so that it is above the threshold speed, then the body is disabled as shown by steps 208. Once the brakes are disengaged, then control system 12 is configured to move the transmission back into gear as shown by step 216. The process then repeats itself again.

The configuration shown in FIG. 5 allows an operator to travel down a road and collect refuse without performing an excessive number of shifting operations. For example, as the operator approaches a refuse bin, the operator engages the brakes. Once, the vehicle's speed slows so that it is below the threshold speed then control system 12 moves the transmission out of gear (e.g., moves the transmission into neutral).

The operator continues to engage the brakes by pressing on the brake pedal. As soon as the operator disengages the brakes then control system 12 is configured to move the transmission back into gear. In an exemplary embodiment, control system 12 shifts gears in the transmission by sending commands to the ECU in transmission control system 28.

The process depicted in connection with FIG. 5 is particularly suitable for automatic transmissions because automatic transmissions are typically easier to move in and out of gear and can be done so electronically without operator input. The transmission gear shifter may be moved into and out of gear using any of a number of suitable devices, which may include, but should not be limited to hydraulic, electric, and pneumatic actuators. However, manual transmissions and other transmissions may also be controlled according to the process depicted by FIG. 5.

The threshold speed referred to in step 212 and 212 is between approximately 2 kilometers per hour and approximately 20 kilometers per hour, desirably, between approximately 4 kilometers per hour and approximately 8 kilometers per hour, or, suitably, approximately 5 kilometers per hour.

The process shown in FIG. 5 may be modified in a number of ways according to other exemplary embodiments. For example, in one exemplary embodiment, control system 12 may be configured to perform only those steps up to where the transmission is moved out of gear and the body is enabled, steps 214 and 210. In this embodiment, the operator of the vehicle is responsible to move the transmission back into gear after disengaging the brakes.

Figure 6:
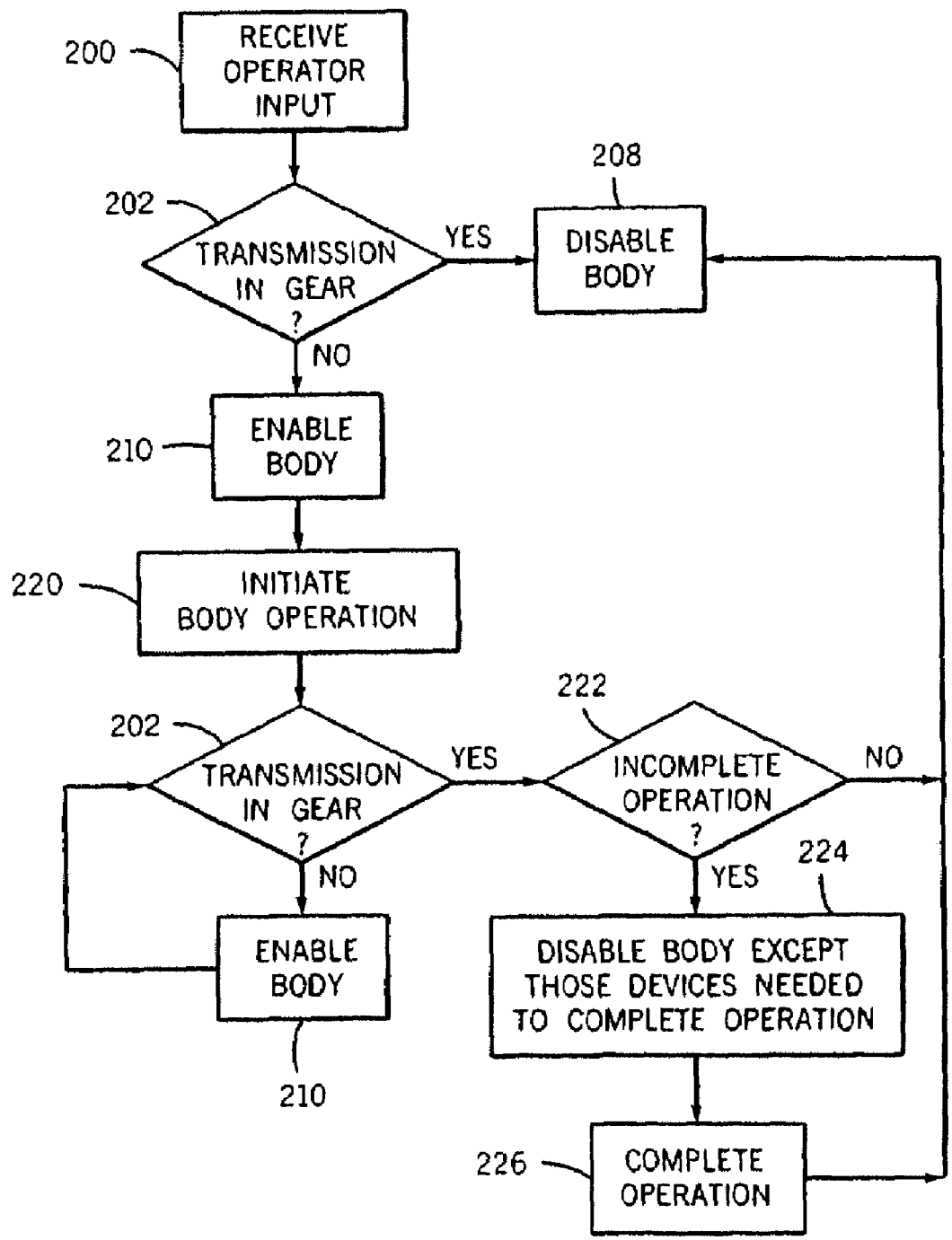

Referring to FIG. 6, another exemplary embodiment for controlling refuse vehicle 10 is shown. In general, this embodiment allows an operation that is initiated when the body is enabled to be completed when the body would otherwise be disabled. Each step in the process is described in further detail below.

At step 202, control system 12 determines whether the transmission is in gear. If the transmission is not in gear, then the body is enabled as shown by step 210. At step 220, control system 12 initiates an operation of the body. While control system 12 is controlling the operation, it is also continually monitoring the status of the transmission. When the transmission is shifted into gear, control system 12 determines whether an operation remains to be completed. If there is not an incomplete operation, then control system 12 simply disables the body as shown by step 208. If, however, there is an incomplete operation, control system 12 disables the output devices and/or operations associated with the body except for those needed to complete the operation as shown at step 224. At step 226, control system 12 completes the operation. After completion, the body is disabled as shown by step 208.

In another exemplary embodiment, the process depicted in FIG. 6 may be altered so that only selected operations can be completed when the transmission is in gear. For example, if the operation is loading refuse into a refuse vehicle 10 with a front refuse loader then control system 12 may be configured to determine the position of the refuse loader and only allow the operation to be completed if the refuse loader is beyond a set position. The set position may correspond to a position where the refuse loader extends above the refuse vehicle (e.g., the forks are positioned above the refuse vehicle with a refuse bin positioned thereon). In this situation, it is typically desirable to allow the operation to be completed so that the refuse loader is not disabled in a position where it might strike overhead objects such as tree branches and power lines. However, if the refuse loader has just begun the refuse loading operation, then it may be desirable to disable the refuse loader until the transmission is out of gear, or until some other condition is met (e.g., transmission is in gear and brakes are engaged, transmission is in gear and clutch is disengaged, etc.).

Of course, a number of modifications may be made to the process shown in FIG. 6. For example, steps 204 and 206 from FIG. 3 may be added immediately after step 202 in FIG. 6. In this example, an operation may be initiated even when the transmission is in gear as long as either the brakes are engaged or the clutch is disengaged. Also, the principles described in connection with FIGS. 4 and 5 may also apply. For example, in another embodiment, an operation may be initiated when the transmission is in gear as long as the brakes are engaged and the vehicle's speed is not above a certain speed. In short, many of the principles discussed in relation to one embodiment may be combined with the embodiment shown in FIG. 6 or any other suitable embodiment unless noted otherwise.

Figure 7:
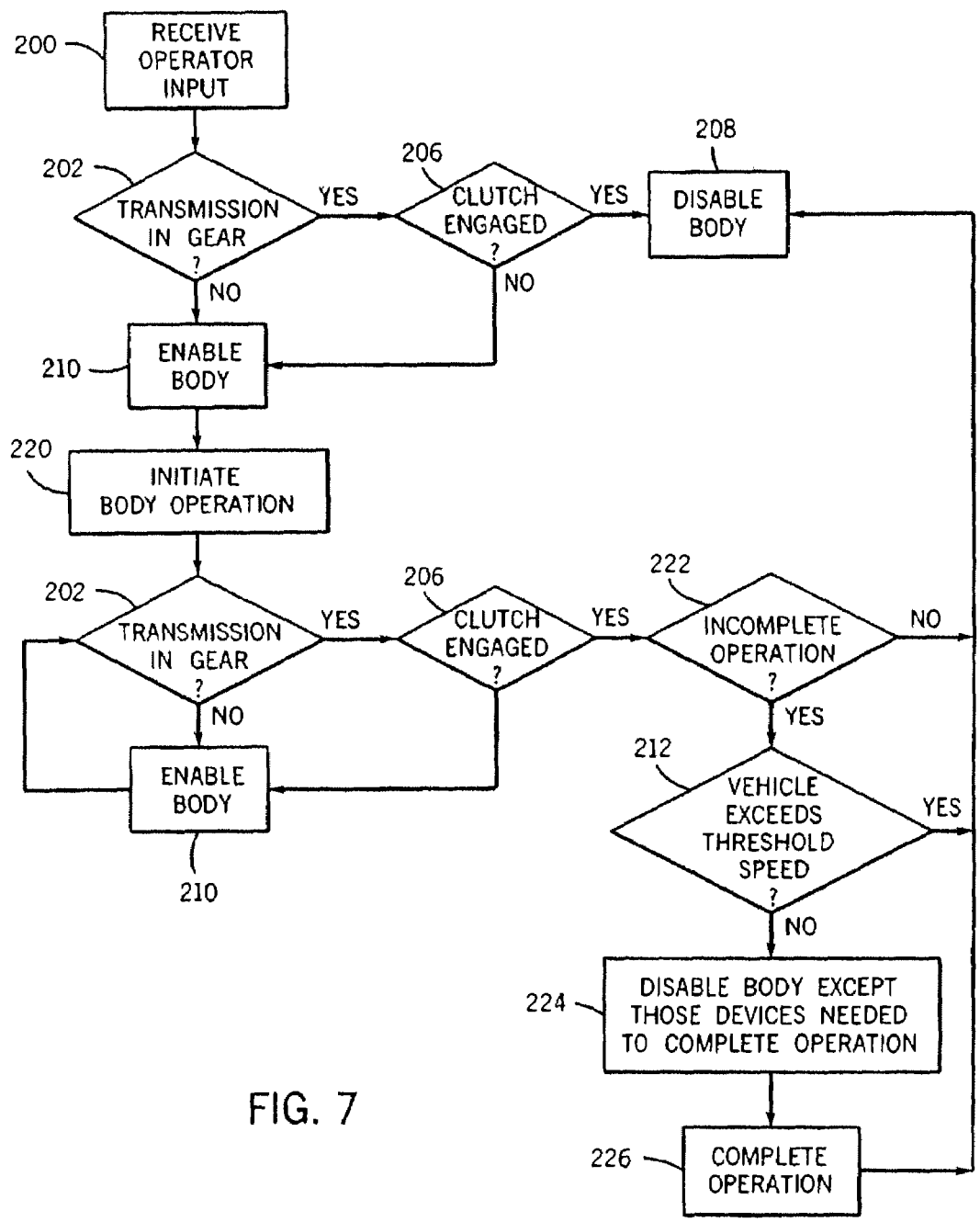

Referring to FIG. 7, an exemplary embodiment is shown of a process for controlling refuse vehicle 10. This embodiment is similar to that shown in FIG. 6. In the process shown in FIG. 7, control system 12 is configured to monitor the status of the transmission at step 202 and the status of the clutch at step 206. The body is enabled at step 210 if either the transmission is not in gear or the transmission is in gear and the clutch is not engaged. Once the body is enabled, control system 12 initiates an operation. Control system 12 continually monitors the state of the transmission and clutch. Once the transmission is in gear and the clutch is engaged, then control system 12 determines whether there is a pending operation that needs to be completed at step 222. If there is not an incomplete operation, then the body is disabled at step 208. If there is an incomplete operation, then control system 12 determines whether the speed of vehicle 10 is over a threshold speed at step 212. If the speed of the vehicle is over the threshold speed, then control system 12 disables the body at step 208. If the speed is not over the threshold speed, then control system 12 is configured to disable the body devices and operations with the exception of those that are needed to complete the operation as shown by step 224. At step 226, the operation is completed and, at step 208, the body is disabled.

In an exemplary embodiment, the threshold speed referred to in step 212 is between approximately 2 kilometers per hour and approximately 20 kilometers per hour, desirably, between approximately 4 kilometers per hour and approximately 8 kilometers per hour, suitably, approximately 5 kilometers per hour. Of course the threshold speed may be varied depending on the nature of the incomplete operation. For example, for one operation, the threshold speed may be approximately 50 kilometers per hour, and, for another operation, the threshold speed may be approximately 30 kilometers per hour.

Figure 8:
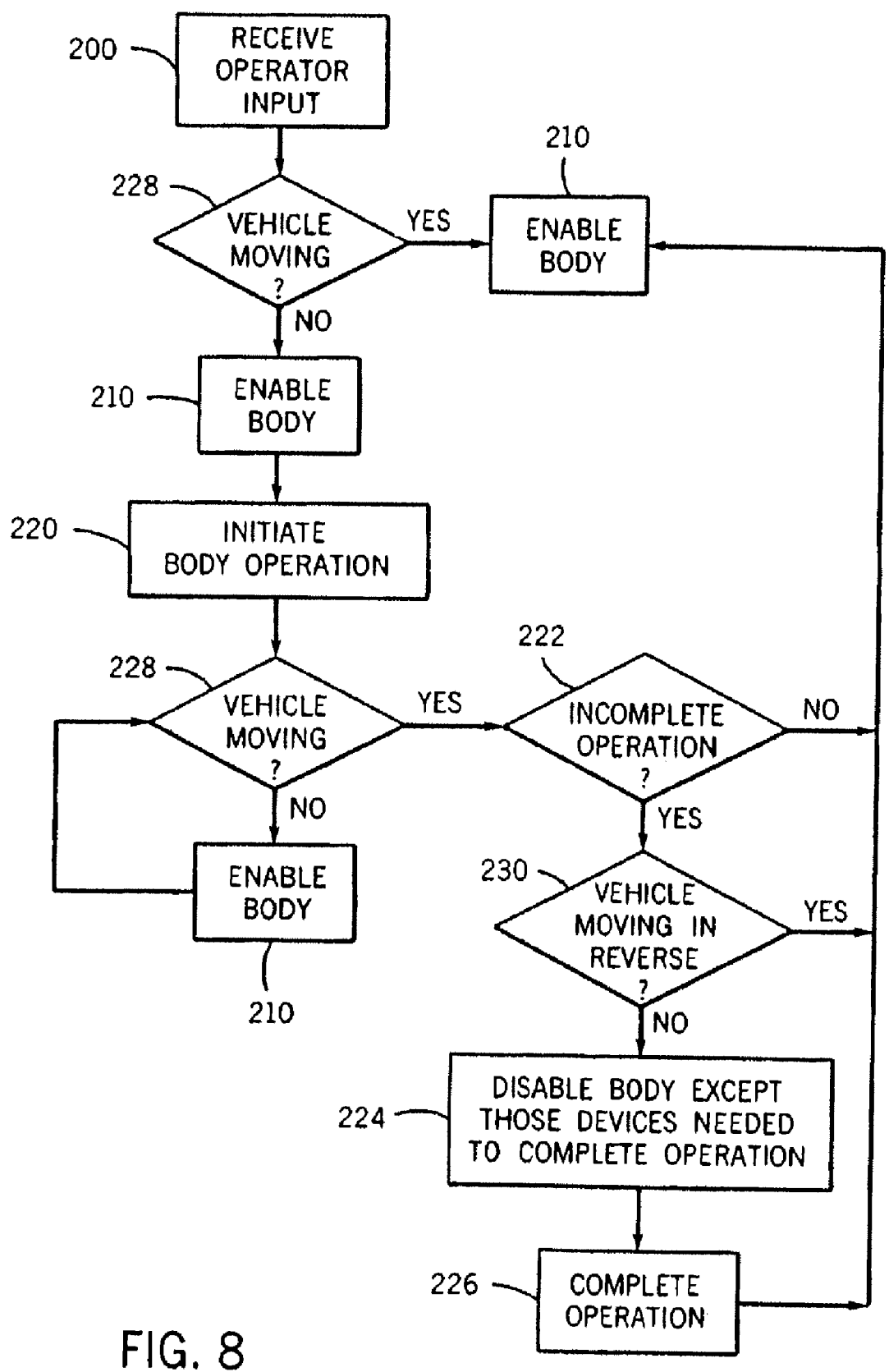

Referring to FIG. 8, another exemplary embodiment of a process for controlling refuse vehicle is shown. In this embodiment, control system 12 is generally configured to disable the body when refuse vehicle 10 is moving and enable the body when refuse vehicle 10 is not moving. If an operation is initiated when refuse vehicle 10 is not moving, the operation may be continued as long as refuse vehicle 10 is not moving in reverse. The process is described in further detail below.

At step 228, control system 12 determines whether refuse vehicle 10 is moving. If refuse vehicle 10 is not moving then the body is enabled at step 210. When the body is enabled, control system 12 initiates an operation of the body. Control system 12 is configured to continually or periodically monitor the movement of refuse vehicle 10. Once refuse vehicle 10 begins to move, control system 12 determines whether one or more operations remain to be completed at step 222. If there are no operations to be completed then the body is disabled at step 208. However, if there is at least one incomplete operation, then, at step 230, control system 12 determines whether refuse vehicle 10 is moving in reverse. If it is moving in reverse, then control system 12 disables the body at step 208. If it is not moving in reverse, then control system 12 only disables those devices and operations that are not associated with the incomplete operation, as shown by step 224. The operation is completed at step 226 and the body is disabled at step 208.

The process depicted in FIG. 8 may be altered in a variety of ways. For example, in one exemplary embodiment, control system 12 may be configured to monitor the status of the transmission at steps 228 and 230. Step 228 in this embodiment would then be similar to step 202 shown in FIG. 6. At step 230, control system 12 would determine whether the transmission is in reverse rather than monitoring whether refuse vehicle 10 is moving in reverse. In another exemplary embodiment control system 12 may be configured to monitor whether a person is standing on footboard 118 before allowing an incomplete operation to be completed. This step may replace step 230 in FIG. 8 or may be added before or after step 230, or, for that matter, the step may be added at any suitable location in the process of FIG. 8.

Figure 9:
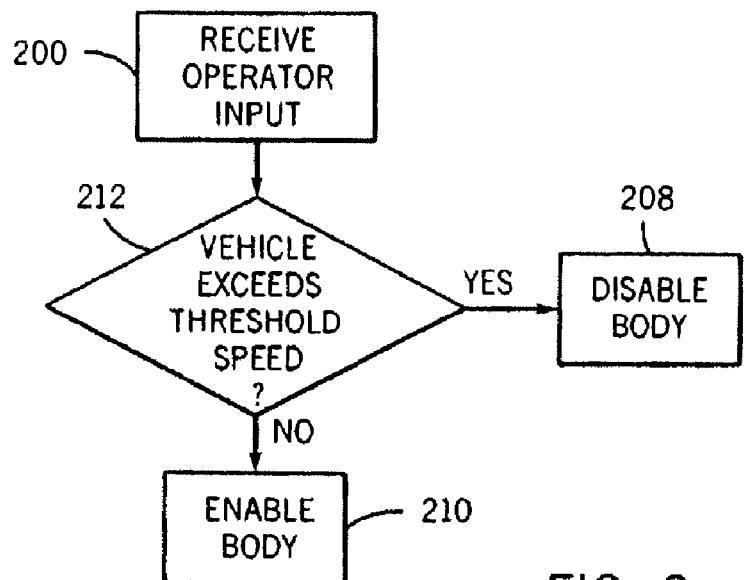

Referring to FIG. 9, an exemplary embodiment of a process for controlling refuse vehicle 10 is shown. In general, this process allows all or selected body devices and operations to be enabled or disabled depending on the speed of refuse vehicle 10. In an exemplary embodiment, multiple body devices and/or operations are configured to be disabled and enabled based on a threshold speed corresponding to each device and/or operation.

At step 212, control system 12 is configured to determine whether the speed of refuse vehicle 10 is over a threshold speed. If the speed of refuse vehicle 10 is over the threshold speed, then the body is disabled at step 208. If the speed of refuse vehicle 10 is not over the threshold speed, then the body is enabled at step 210. In an exemplary embodiment, the threshold speed is between approximately 2 kilometers per hour and approximately 20 kilometers per hour or, desirably, between approximately 4 kilometers per hour and approximately 8 kilometers per hour or, suitably, approximately 5 kilometers per hour. In another embodiment, the threshold speed is between approximately 20 kilometers per hour and approximately 50 kilometers per hour or, desirably, approximately 30 kilometers per hour.

Figure 10:
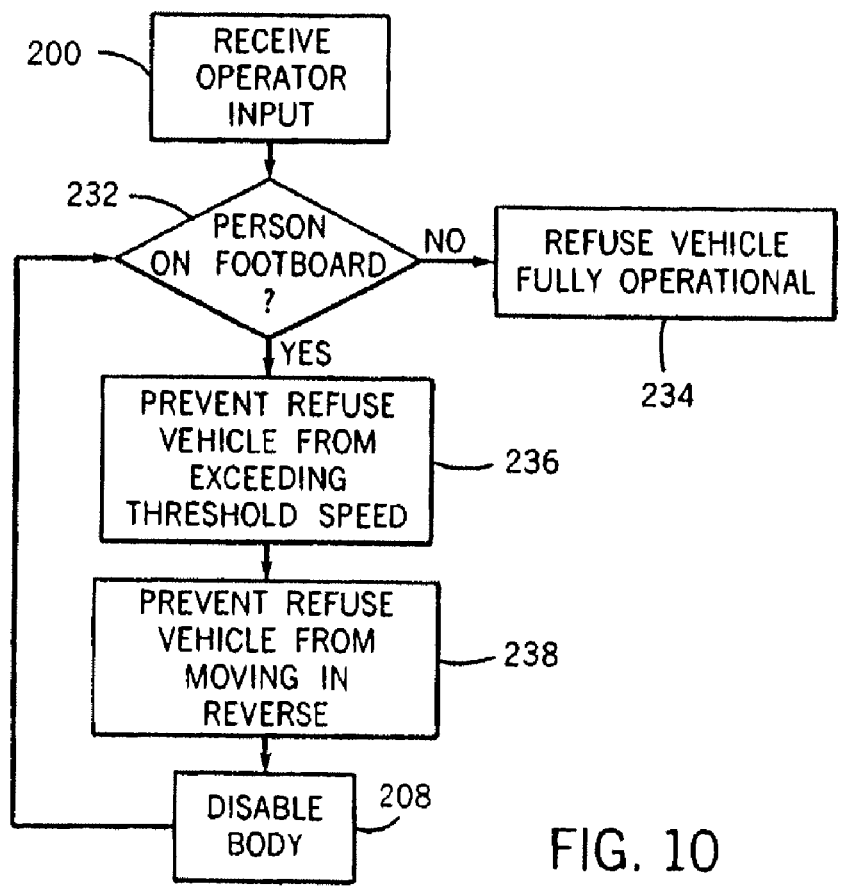

Referring to FIG. 10, an exemplary embodiment of a process for controlling refuse vehicle 10 is shown. In general, control system 12 is configured to control refuse vehicle 10 based on whether a person is positioned on a footboard 118. This is desirable to prevent certain operations and/or vehicle movements that may potentially harm the person.

At step 232, control system 12 determines whether a person is positioned on footboard 118. If no one is positioned on footboard 118, then refuse vehicle 10 is fully operational as shown by step 234. Of course, in other embodiments, control system 12 may be configured so that certain operations are only available if a person is positioned on footboard 118. If a person is positioned on footboard 118, control system 12 prevents refuse vehicle 10 from exceeding a threshold speed at step 236 and prevents refuse vehicle 10 from moving in reverse at step 238. Control system 12 also disables the body at step 208.

In an exemplary embodiment, the threshold speed referred to in step 236 is between approximately 15 kilometers per hour and approximately 40 kilometers per hour, desirably, between approximately 25 kilometers per hour and approximately 35 kilometers per hour, or, suitably, is approximately 30 kilometers per hour.

In other exemplary embodiments, control system 12 may be configured to perform only one or any combination of steps 236, 238, and 208. Also, control system 12 may be configured to enable and/or disable various combinations of devices and/or operations of refuse vehicle 10 (e.g., various combinations of body devices and operations as well as various combinations of chassis devices and/or operations).

Figure 11:
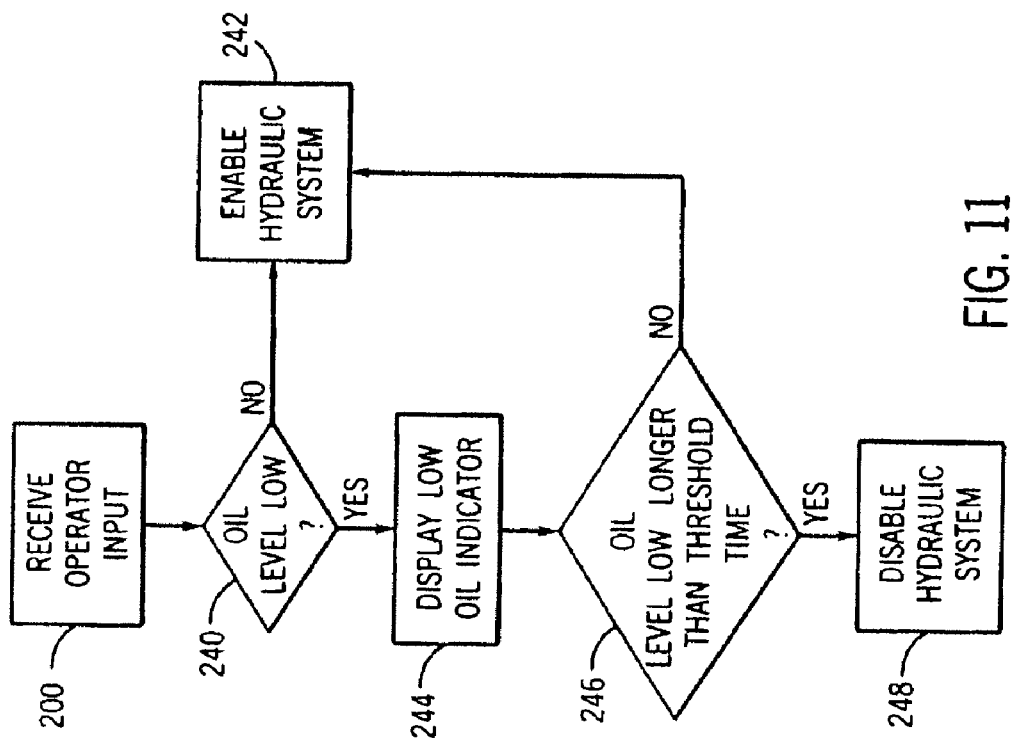

Referring to FIG. 11, an exemplary embodiment of a process for controlling a hydraulic system for refuse vehicle 10 is shown. In general, the process shown in FIG. 11 may be used to prevent the undesirable effects that may occur when the hydraulic oil is low such as increased pump wear, adverse interactions of the components of refuse vehicle 10 (e.g., two components no longer move in sequence because one is no longer receiving hydraulic oil causing them to collide, etc.), etc.

At step 240, control system 12 is configured to determine whether the oil level is low (e.g., below a set point). If the oil level is not low, then the hydraulic system of refuse vehicle 10 is enabled at step 242. If the oil level is low, control system 12 displays a low oil level indicator on display 16, as shown in step 244. At this point, the hydraulic system is still enabled. However, at step 246, the control system 12 determines how long the oil level has been low. If the oil level has been low for longer than a threshold time, then control system 12 disables the hydraulic system at step 248, which typically involves moving the hydraulic devices to a fully retracted position. Once shutdown is complete, control system 12 is configured to disable further operation of the hydraulic system at step 248 until more oil is provided.

The threshold time that must expire between initially determining that the oil level is low and the shutdown procedure is between approximately 1 second and approximately 10 seconds or, desirably, is approximately 2 seconds. In another embodiment, the set time is between approximately 50 seconds and approximately 90 seconds or, desirably, is approximately 70 seconds.

Figure 12:
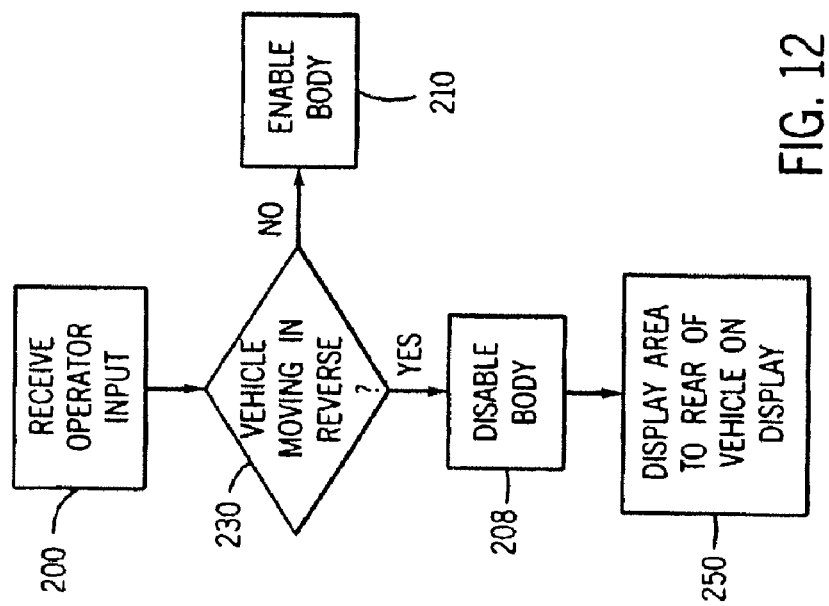

Referring to FIG. 12, an exemplary embodiment of a process for controlling refuse vehicle 10 is shown. In general, control system 12 is configured to disable the body and display an image of an area to the rear of refuse vehicle 10 when refuse vehicle 10 is moving in reverse. Each step is described in more detail below.

At step 230, control system 12 is configured to determine whether refuse vehicle 10 is moving in reverse. If it is not moving in reverse, then the body is enabled, as shown by step 210. If refuse vehicle 10 is moving in reverse, then control system 12 disables the body at step 208, and displays an image of the area to the rear of refuse vehicle 10 on display 16, as shown by step 250. The image is provided by a camera mounted to a rear portion of refuse vehicle 10.

In an exemplary embodiment, the image displayed on display 16 is a video image. In another exemplary embodiment, the image is a still image. The still image may be updated periodically or may only be updated when there is an event that requires the image to be displayed (e.g., putting transmission in reverse, moving in reverse, etc.). In another exemplary embodiment, control system 12 may be configured to monitor whether the transmission is positioned in reverse instead of monitoring whether the vehicle is moving in reverse as shown by step 230. Other configurations may also be used.

Figure 13:
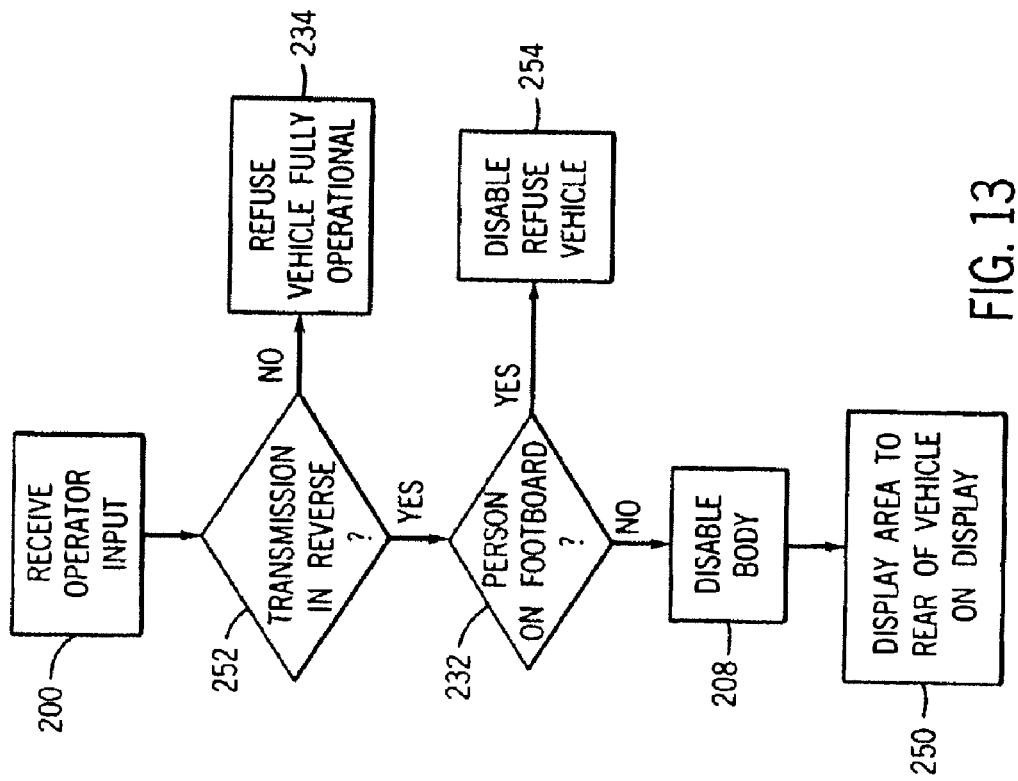

Referring to FIG. 13, an exemplary embodiment of a process for controlling refuse vehicle 10 is shown. At step 252, control system 12 determines whether the transmission is in reverse. If the transmission is not in reverse then refuse vehicle 10 is fully enabled. At step 232, control system 12 determines whether a person is positioned on footboard 118. If a person is positioned on footboard 118, control system 12 is configured to disable the body and shut down the engine, as shown at step 254. If a person is not positioned on footboard 118, control system 12 is configured to disable the body, shown at step 208, and display the area to the rear of refuse vehicle 10 on display 16, as shown at step 250.

In another exemplary embodiment, control system 12 may be configured to perform the process shown in FIG. 13 without displaying the area to the rear of refuse vehicle 10. Also, a number of other desirable configurations may used.

Figure 14:
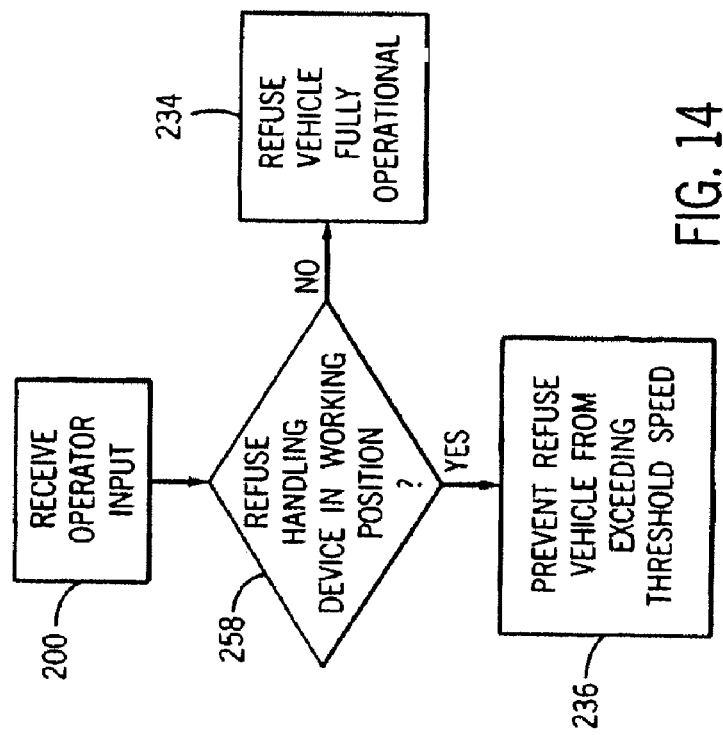

Referring to FIG. 14, an exemplary embodiment of a process for controlling refuse vehicle 10 is shown. At step 258, control system 12 determines whether a refuse handling device is in a working position. If the refuse handling device is not in a working position then refuse vehicle 10 is fully enabled, as shown at step 234. If the refuse handling device is in a working position, then control system 12 disables refuse vehicle 10 from exceeding a threshold speed, as shown at step 236. In an exemplary embodiment, the refuse handling device is a refuse loader. In other embodiments, the refuse handling device may be a compactor or any other suitable device. In an exemplary embodiment, the threshold speed is between approximately 15 kilometers per hour and approximately 40 kilometers per hour, desirably, between approximately 25 kilometers per hour and approximately 35 kilometers per hour, or, suitably, is approximately 30 kilometers per hour.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art that these terms are intended to allow a description of certain features described and claimed without restricting the scope of these features to the precise numerical ranges, etc. provided. Accordingly, these terms should be interpreted as indicating that insubstantial or inconsequential modifications or alterations of the subject matter described and claimed are considered to be within the scope of the invention as recited in the appended claims.

The construction and arrangement of the elements of the refuse vehicles and control systems as shown in the exemplary embodiments are illustrative only. Although only a few embodiments of the present inventions have been described in detail in this disclosure, those skilled in the art who review this disclosure will readily appreciate that many modifications are possible without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to any of the exemplary embodiments. Other substitutions, modifications, changes and omissions may be made in the design, operating conditions and arrangement of the various exemplary embodiments without departing from the scope of the present invention as expressed in the appended claims.

What is claimed is:
1. A refuse vehicle comprising:
 a footboard, the footboard located on a refuse vehicle exterior; and
 a control system which comprises:
  a plurality of microprocessor based interface modules;

a communication network configured to interconnect the plurality of interface modules; and
at least one output device;
wherein the control system is configured to allow full operations of the refuse vehicle based on no one being positioned on the footboard;
wherein the control system is configured to allow a first operation based on a person being positioned on the footboard;
wherein the control system is configured to disable a second operation based on the person being positioned on the footboard.

2. The refuse vehicle of claim 1, wherein the second operation is a compacter operation.

3. The refuse vehicle of claim 1, wherein the second operation is a refuse loader operation.

4. The refuse vehicle of claim 1, wherein the second operation is the refuse vehicle moving in reverse.

5. The refuse vehicle of claim 1, wherein the second operation is at least one of a tailgate of the refuse vehicle opening and closing.

6. The refuse vehicle of claim 1, further comprising:
a chassis; and
a body.

7. The refuse vehicle of claim 1, wherein the control system further comprises:
a plurality of input devices;
a plurality of output devices; and
a subsystem control system which includes an electronic control unit, the subsystem control system being configured to include vehicle speed information;
wherein each of the plurality of interface modules is coupled to respective ones of the plurality of input devices and the plurality of output devices;
wherein the vehicle speed information is communicated from the subsystem control system to at least one of the plurality of interface modules where it is stored.

8. The refuse vehicle of claim 7, wherein the second operation is the refuse vehicle moving faster than a threshold speed.

9. The refuse vehicle of claim 8, wherein the threshold speed is between approximately 15 kilometers per hour and approximately 40 kilometers per hour.

10. The refuse vehicle of claim 8, wherein the threshold speed is between approximately 25 kilometers per hour and approximately 35 kilometers per hour.

11. The refuse vehicle of claim 1, further comprising:
a chassis; and
a body which includes the footboard.

12. The refuse vehicle of claim 1, further comprising a transmission and wherein the control system is configured to disable the second operation when the transmission is in gear.

13. A refuse vehicle comprising:
a chassis which includes an engine and a transmission;
a body which includes a footboard, the footboard located on a refuse vehicle exterior; and
a control system which comprises:
a plurality of microprocessor based interface modules; and
a communication network configured to interconnect the plurality of interface modules;
wherein the control system is configured to disable refuse handling operations based on a person being positioned on the footboard.

14. The refuse vehicle of claim 13, wherein the control system is configured to shut the engine off based on the transmission status indicating that the transmission is in reverse.

15. The refuse vehicle of claim 13, further comprising a subsystem control system which includes an electronic control unit, the subsystem control system being configured to include vehicle speed information and wherein the control system is configured to prevent the refuse vehicle from moving faster than a threshold speed based on the position of the person on the footboard.

16. The refuse vehicle of claim 15, wherein the threshold speed is between approximately 15 kilometers per hour and approximately 40 kilometers per hour.

17. A refuse vehicle comprising:
a chassis which includes an engine and a transmission;
a body which includes a footboard, the footboard located on a refuse vehicle exterior; and
a control system which comprises:
a plurality of microprocessor based interface modules;
a subsystem control system which includes an electronic control unit, the subsystem control system being configured to include vehicle speed information;
a communication network configured to interconnect the plurality of interface modules;
a plurality of input devices including a camera; and
a plurality of output devices including a display;
wherein the control system is configured to shut the engine off based on a transmission status and person being positioned on the footboard;
wherein the control system is configured to display at least one image of an area of the refuse vehicle based on at least one of the transmission being in reverse, the refuse vehicle moving in reverse, and the person being positioned on the footboard.

18. The refuse vehicle of claim 17, wherein the control system is configured to disable a compacter based on the person being positioned on the footboard.

19. The refuse vehicle of claim 17, wherein the control system is configured to disable a refuse loader based on the person being positioned on the footboard.

20. The refuse vehicle of claim 17, wherein the control system is configured to disable the refuse vehicle from moving in reverse based on the person being positioned on the footboard.

* * * * *